United States Patent [19]

Craft et al.

[11] 4,113,069
[45] Sep. 12, 1978

[54] SMALL TRANSMISSION WITH BRAKE

[76] Inventors: Jacob A. Craft, 9376 Mt. Gilead Rd.;
Hans Hauser, 12336 Hilltop Dr.,
both of, Fredericktown, Ohio 43019

[21] Appl. No.: 800,932

[22] Filed: May 26, 1977

[51] Int. Cl.² .............................................. F16D 55/02
[52] U.S. Cl. ................................................... 188/72.7
[58] Field of Search .................. 188/72.2, 72.3, 72.7, 188/72.8, 72.9

[56] References Cited

U.S. PATENT DOCUMENTS

| | | | |
|---|---|---|---|
| 3,110,364 | 11/1963 | Butler | 188/72.7 X |
| 3,485,329 | 12/1969 | Hauser | 188/72.8 X |
| 3,651,897 | 3/1972 | Hahn | 188/72.7 X |
| 3,765,511 | 10/1973 | Toyomasu | 188/72.7 X |
| 3,878,921 | 4/1975 | Kibler et al. | 188/72.7 X |

*Primary Examiner*—Duane A. Reger
*Attorney, Agent, or Firm*—Allen D. Gutchess, Jr.

[57] ABSTRACT

A small transmission which is used with riding lawn mowers, snowmobiles, etc. has a brake combined therewith in one unit. Manufacturers of lawn mowers, etc. can buy the transmission and brake in one package and save considerably in assembly costs. The new brake is easier to operate than those heretofore known, involving less friction, and is subjected to less wear. The new brake also has a stationary jaw or puck holder which enables it to be made less expensively, and other components of the brake are also less expensive to produce.

4 Claims, 6 Drawing Figures

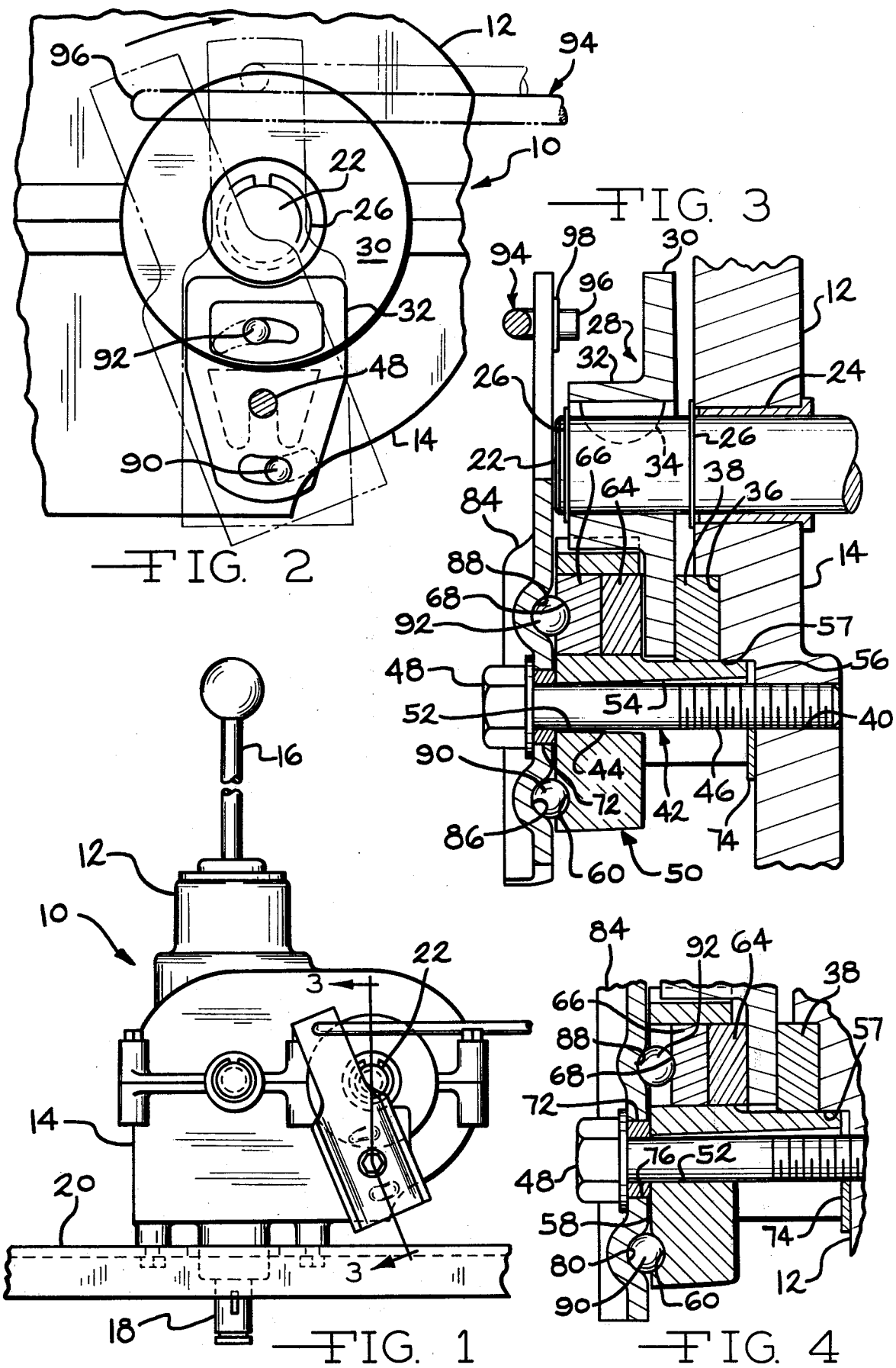

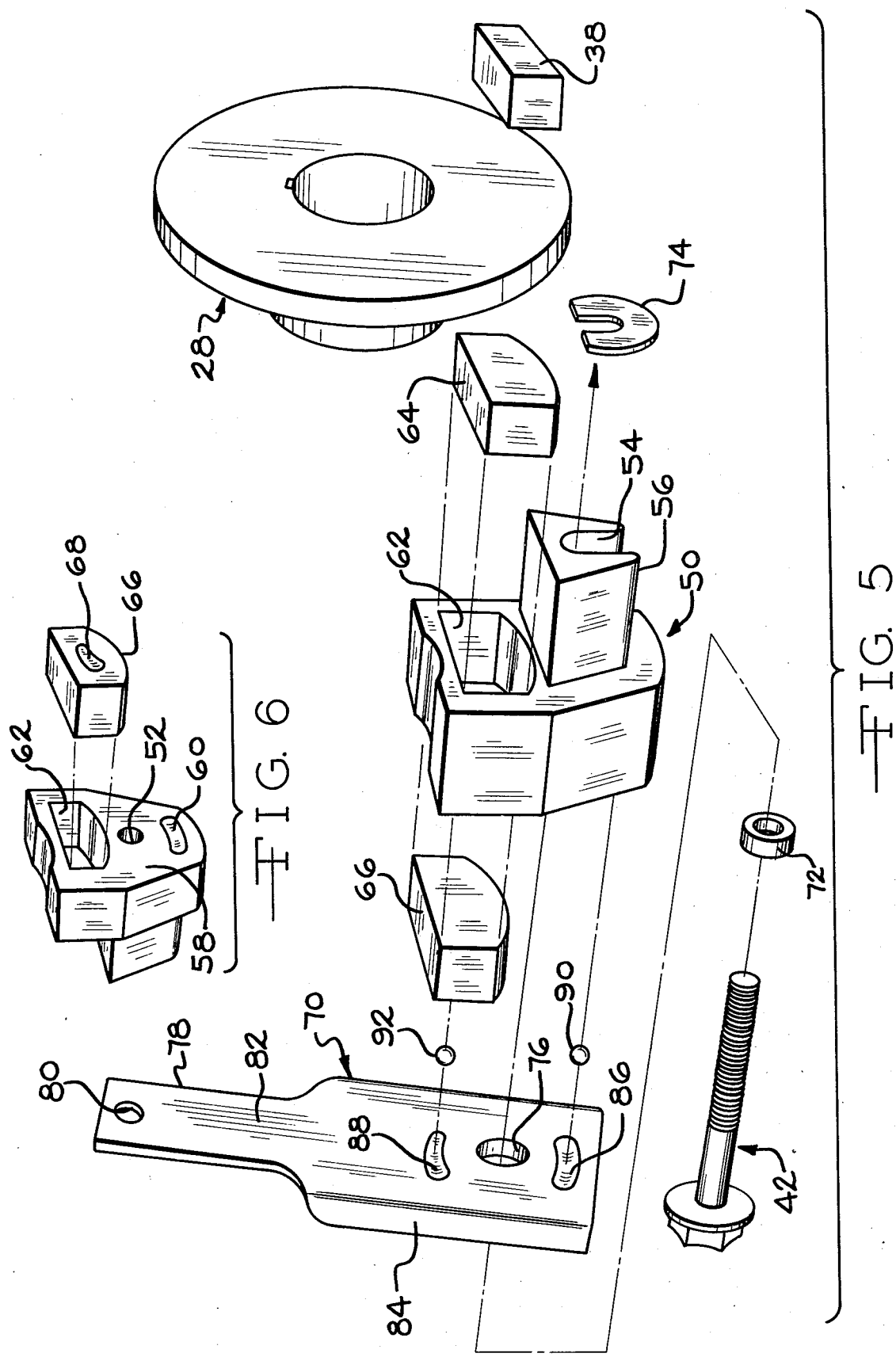

SMALL TRANSMISSION WITH BRAKE

This invention relates to a small transmission having a brake combined therewith in one unit.

Manufacturers of small vehicles, such as riding lawn mowers, snowmobiles, golf carts, etc. usually employ transmissions from outside sources. Heretofore, the manufacturers had to provide suitable brakes for the vehicles, with the brakes including a number of separate components that had to be assembled with the vehicle and the axle, involving substantial labor and component costs. The brakes required extra space, which made the design of the vehicle more difficult. The brakes also were usually exposed in such a manner as to be subjected to possible damage.

The brake in accordance with the invention is combined with the transmission, and the separate brake otherwise required on the live axle of the vehicle or other powered device can be eliminated. The above disadvantages are also eliminated with the combined transmission and brake.

The new brake also constitutes an improvement over the brake shown in Hauser U.S. Pat. No. 3,485,329. The new brake has a stationary jaw or puck holder which is subjected to less stress and can be made less expensively. Certain other brake components can also be made less expensively due to the new design. The new brake also operates with less friction so that less force is required to apply the brake and the components of the new brake are also subjected to less wear.

It is, therefore, a principal object of the invention to provide a transmission combined with an improved brake for use with a powered device, such as a small vehicle.

Another object of the invention is to provide a brake for use with a small transmission, which brake is less expensive than those heretofore known.

A further object of the invention is to provide an improved brake for use with a small transmission, which brake operates with less friction and is less subjected to wear.

Many other objects and advantages of the invention will be apparent from the following detailed description of a preferred embodiment thereof, reference being made to the accompanying drawings, in which:

FIG. 1 is a side view in elevation of a transmission having a brake according to the invention;

FIG. 2 is an enlarged fragmentary view of a portion of the transmission and the brake of FIG. 1;

FIG. 3 is an enlarged fragmentary view in cross section taken along the line 3—3 of FIG. 1;

FIG. 4 is a detailed view in cross section of certain components of FIG. 3 shown in different positions;

FIG. 5 is an exploded view in perspective of the new brake; and

FIG. 6 is an exploded view in perspective, taken from the opposite side, of certain components shown in FIG. 5.

Referring to FIG. 1, a transmission is indicated at 10 and includes an upper housing half 12 and a lower housing half 14. A shift lever 16 extends upwardly from the upper half and a drive or input shaft 18 extends below the lower half. The shaft projects below a mounting plate 20 constituting part of the vehicle or other power devices on which the transmission is used. The input shaft 18 is connected to an intermediate shaft through internal bevel gears and spur gears (not shown) with the intermediate shaft mechanically connected to an output shaft 22 through any of several sets of gears selected by the shift lever 16. The output shaft has a drive sprocket (not shown) affixed to one end thereof to drive a live axle or other drive component of the vehicle or other powered device. The input shaft 18 can be connected to the engine through a suitable pulley and V-belt arrangement, for example.

The brake portion of the output shaft 22 extends outwardly between the transmission housing halves 12 and 14, preferably on the side opposite the sprocket, although the brake itself can be employed on the same side if desirable for a particular application. As shown in FIG. 3, the shaft extends through a bushing 24 and has two spaced annular grooves which receive split retaining rings 26. A brake element 28 is located on the shaft 22 between the rings 26 and includes an annular disc 30 and a hub 32 which is connected to the shaft through a key 34. The disc element 28 thus rotates with the shaft 22 and can move longitudinally to a limited extent between the retaining rings 26.

The lower housing half 14 has a recess 36 cast therein to receive and hold a first friction puck or pad 38 which is made of a suitable friction material. The thickness of the puck 38 exceeds the depth of the recess 36 so as to protrude outwardly therefrom and be capable of engaging a rear annular surface of the brake disc 30. The lower housing half 14 also has a threaded hole 40 therein to receive a supporting member or bolt 42 which constitutes an elongate supporting member for the brake. The bolt 42 is a stock item and includes a smooth cylindrical portion 44, a threaded end 46, and a hex head 48.

A brake pad jaw or holder 50 is supported on the bolt 42 and specifically has a hole or bore 52 through which the cylindrical portion 44 of the bolt extends. The holder also has a groove 54 in a shank 56 aligned with the passage 52 and receiving part of the portion 44 and the threaded end 46 of the bolt 42. The shank 56 abuts a portion of the lower housing half 14 around the threaded opening 40 to maintain the holder 50 in spaced relationship with respect to the lower housing half 14. The upper surface of the shank 56 contacts the brake puck 38 to aid in retaining it in place in the recess 36. The upper surface of the shank 56 also bears against a shoulder 57 of the lower housing half 14 to prevent the holder 50 from pivoting on the bolt.

The brake puck holder 50 further has a flat outer surface 58 (FIG. 6) with a lower shallow, arcuate groove 60 therein. A large opening or chamber 62 extends through an upper portion of the holder 50 and slidably retains second brake puck means which includes an outer brake puck or pad 64 shaped similarly to the opening 62 and of the same material as the puck 38. The second brake puck means also includes a back-up pressure block 66 located in the opening 62 and slidably movable therein, being of the same shape as the second puck 64. As shown in FIGS. 3, 4 and 6, the pressure block 56 has an arcuate groove 68 therein of varying depth, being deeper at the left end as viewed in FIG. 6 than at the right end.

A brake lever 70 is pivotally supported on a spacer ring 72 on the supporting bolt 42 with a washer being integral with the bolt head 48. A spacer 74 can be located between the end of the shank 56 and the adjacent portion of the housing half 14. The brake lever 70 has a pivot hole 76 through which the spacer ring 72 extends and has an upper arm 78 with a brake rod opening 80 therein (FIG. 5). The brake lever 70 has a main flat portion 82 which lies adjacent the surface 58 of the holder 50 with a pair of stiffening flanges 84 extending outwardly therefrom. The flat portion 82 has a lower arcuate groove 86 therein below the opening 76 and is of uniform depth throughout most of its length, as is the arcuate groove 60 in the holder 50. Above the opening 76 is a second arcuate groove 88 which, like the groove 68, is of varying depth throughout its length, being deeper at the left end, as viewed in FIG. 5. A lower bearing ball 90 is received into the grooves 60 and 86 when the brake lever 70 is assembled with the holder 50 on the supporting bolt 42. Similarly, an upper bearing ball 92 is received in the tapered grooves 68 and 88.

A brake rod 94 has a curved end 96 extending into the opening 80 of the brake lever 70 and is held by a suitable locking ring 98. When the brake rod 94 is pulled, it pulls the brake lever 70 in a clockwise direction. During the movement, the lower end of the brake lever 70 moves freely, being spaced from the surface 58 of the holder 50 by the bearing ball 90 in the grooves 60 and 86. However, this movement of the brake lever moves the pressure ball 92 from the deeper ends of the grooves 68 and 88 to the shallower ends thereof and moves the back-up block 66 and the brake puck 64 inwardly, from the position of FIG. 3 to the position of FIG. 4. This forces the brake pucks 38 and 64 against the surfaces of the brake disc 30 to apply the brakes. When the brake rod 94 is released, a spring at the brake pedal or other suitable spring urges the brake lever 70 back to the rear position. At this time the pressure on the brake puck 64 is released and the disc 30 can rotate freely between the brake pucks 64 and 38.

With this design, there is no stress on the brake puck holder 50 so that this component can be made less expensively than heretofore, being made of powdered metal rather than die cast. The supporting bolt 42 is also a stock item and need not be specially machined as was heretofore required. Since the brake lever 70 never rides directly on the surface 58 of the holder 50, the friction therebetween is substantially reduced and wear is accordingly substantially eliminated.

Various modifications of the above-described embodiment of the invention will be apparent to those skilled in the art, and it is to be understood that such modifications can be made without departing from the scope of the invention, if they are within the spirit and the tenor of the accompanying claims.

We claim:

1. In combination, a transmission housing, an output shaft extending out of said housing, a brake element rotatable with said output shaft, a first brake puck, said housing having a recess with an open side facing away from said output shaft holding said first brake puck, said housing also forming a shoulder adjacent the open side of said recess, a supporting bolt secured to said housing and extending outwardly therefrom near said recess and said shoulder and outside the periphery of said brake element, second brake puck means, a stationary brake puck holder mounted in a fixed position on said bolt, said holder having an opening receiving said second brake puck means, said holder having a shank spacing said holder from said housing and engagable with a portion of said puck at the open side of said recess to retain said first puck in said recess, said shank also having a surface bearing against said housing shoulder to prevent said holder from pivoting on said bolt, a brake lever pivotally mounted on said bolt on the side of said holder opposite said brake element, and means connected between said brake lever and said second brake puck means for moving said second brake puck means towards said brake element and said first puck when said lever is moved.

2. In combination, a transmission housing, an output shaft extending out of said housing, a first brake puck positioned near said output shaft, a brake element rotatable with said output shaft, a supporting bolt secured to said housing and extending outwardly therefrom outside the periphery of said brake element, second brake puck means, a stationary brake puck holder mounted in a fixed position on said bolt, said holder having an opening for receiving said second brake puck means and having a shank engagable with said housing around said bolt to space said holder from said housing, said second brake puck means being positioned by said holder on the side of said brake element opposite said first brake puck, a brake lever pivotally mounted on said bolt on the side of said holder opposite said brake element, and means connecting said brake lever and said second brake puck means for moving said second brake puck means towards said first brake puck when said lever is pivoted, said connecting and moving means comprising said second brake puck means and said brake lever having aligned, tapered, arcuate grooves on one side of said bolt, a ball received in said grooves, said holder and said brake lever having aligned, arcuate grooves of substantially uniform depth throughout their length on another side of said bolt, and a ball received in the uniform grooves 3. The combination according to claim 2 characterized by said tapering grooves tapering in opposite directions.

4. The combination according to claim 2 characterized by said transmission housing forming an open-sided recess with the open side facing away from said output shaft, said housing also forming a shoulder adjacent the open side of said recess, said first puck being in said recess, and said shank being engagable with a portion of said first puck at the open side of said recess to retain said first puck in said recess, said shank also having a portion engaging said housing shoulder to prevent said holder from pivoting on said bolt.

* * * * *

UNITED STATES PATENT OFFICE
CERTIFICATE OF CORRECTION

PATENT NO. : 4,113,069
DATED : September 12, 1978
INVENTOR(S) : Jacob A. Craft, Hans Hauser It is certified that error appears in the above-identified patent and that said Letters Patent are hereby corrected as shown below:

Column 4, line 7, before "puck" insert -- first --.

Signed and Sealed this

Twenty-seventh Day of February 1979

[SEAL]

Attest:

RUTH C. MASON
Attesting Officer

DONALD W. BANNER
Commissioner of Patents and Trademarks

UNITED STATES PATENT OFFICE
CERTIFICATE OF CORRECTION

PATENT NO. : 4,113,069
DATED : September 12, 1978
INVENTOR(S) : Jacob A. Craft and Hans Hauser It is certified that error appears in the above-identified patent and that said Letters Patent are hereby corrected as shown below:

On the title page, after line "[76] Inventors" insert--

[73] Assignee: The J. B. Foote Foundry Co., Fredericktown, Ohio.

Signed and Sealed this

Twenty-sixth Day of June 1979

[SEAL]

Attest:

RUTH C. MASON
Attesting Officer

DONALD W. BANNER
Commissioner of Patents and Trademarks